(12) United States Patent
Anderson et al.

(10) Patent No.: US 8,075,655 B2
(45) Date of Patent: Dec. 13, 2011

(54) ROTATIVE INERTIAL IMPACTOR GAS-OIL SEPARATOR FOR INTERNAL COMBUSTION ENGINE

(75) Inventors: John R. Anderson, Thirsk (GB); Kelly R. Schmitz, Cottage Grove, WI (US); Brian W. Schwandt, Fort Atkinson, WI (US); Peter K. Herman, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 848 days.

(21) Appl. No.: 12/140,401

(22) Filed: Jun. 17, 2008

(65) Prior Publication Data

US 2009/0308249 A1 Dec. 17, 2009

(51) Int. Cl.
*B01D 45/14* (2006.01)
(52) U.S. Cl. ......... 55/400; 55/406; 55/407; 55/DIG. 19; 95/270

(58) Field of Classification Search ............... 55/290, 55/400; 95/261
See application file for complete search history.

(56) References Cited

U.S. PATENT DOCUMENTS

| | | |
|---|---|---|
| 5,261,380 A | 11/1993 | Romano |
| 5,954,035 A | 9/1999 | Hofer |
| 6,279,553 B1 | 8/2001 | Brueggemann et al. |
| 6,584,964 B1 | 7/2003 | Seilenbinder |
| 6,783,571 B2 | 8/2004 | Ekeroth |
| 2003/0000184 A1 | 1/2003 | Dean |
| 2003/0233932 A1 | 12/2003 | Ekeroth |

FOREIGN PATENT DOCUMENTS

| | | |
|---|---|---|
| WO | WO 2004/104381 | 12/2004 |
| WO | WO 2006/119737 | 11/2006 |

*Primary Examiner* — Duane Smith
*Assistant Examiner* — Sonji Turner
(74) *Attorney, Agent, or Firm* — Andrus, Sceales, Starkin & Sawall, LLP (57) ABSTRACT

An internal combustion engine gas-oil separator is provided by one or more rotative inertial impactor separators in an interior chamber of the engine and mounted to a rotating engine shaft in such interior chamber.

12 Claims, 9 Drawing Sheets

ROTATIVE INERTIAL IMPACTOR GAS-OIL SEPARATOR FOR INTERNAL COMBUSTION ENGINE

BACKGROUND AND SUMMARY

The invention relates to gas-oil separators for internal combustion engines, including engine crankcase ventilation separation systems, including closed crankcase ventilation (CCV) and open crankcase ventilation (OCV) systems.

Inertial impactor gas-oil separators for internal combustion engines are known in the prior art, including oil separation systems for blowby gas from the crankcase of the internal combustion engine. Liquid oil particles are removed from the gas-oil mist by inertial impaction, causing a sharp directional change, effecting the noted liquid oil separation.

The present invention arose during continuing development efforts in the above technology.

DETAILED DESCRIPTION

Figures 1, 2:
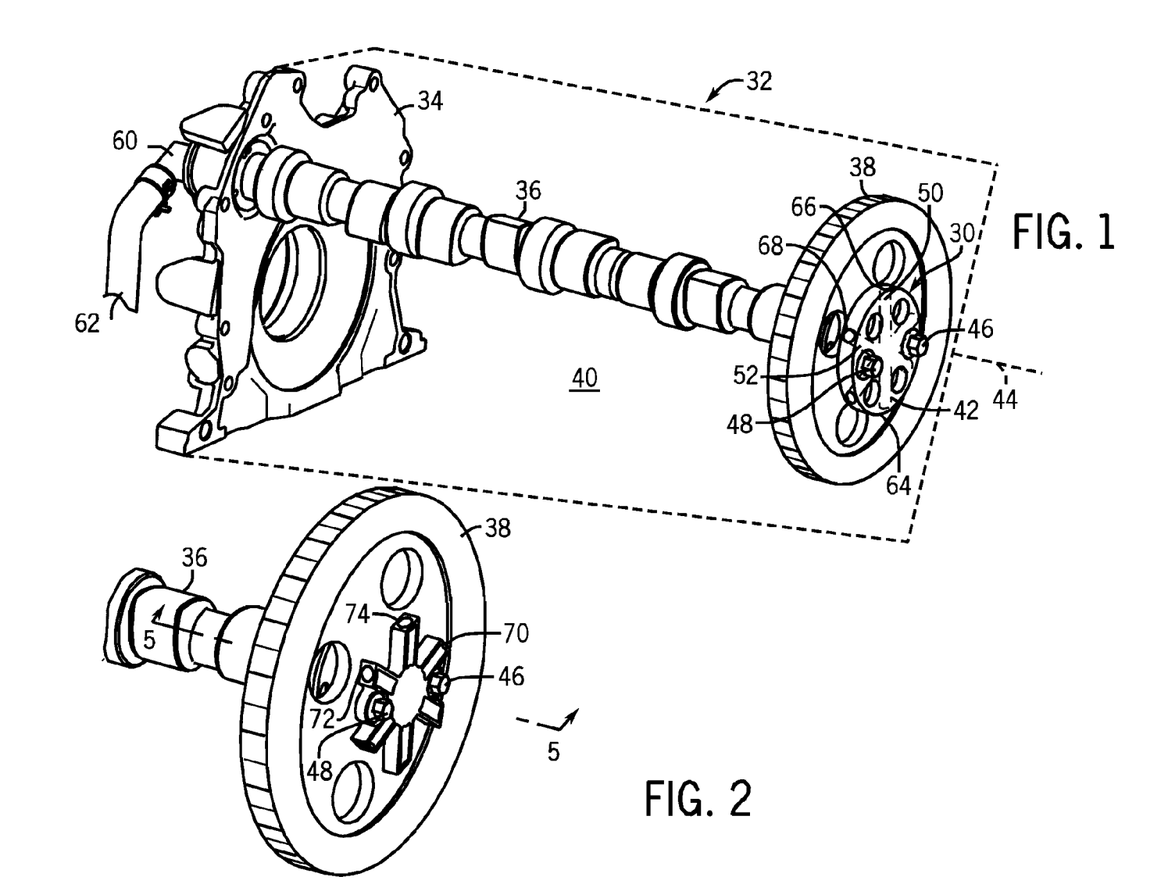
FIG. 1 is an isolated perspective view of a gas-oil separator for an internal combustion engine in accordance with the invention.
FIG. 2 is like a portion of FIG. 1 and shows a further embodiment.
Figure 5:
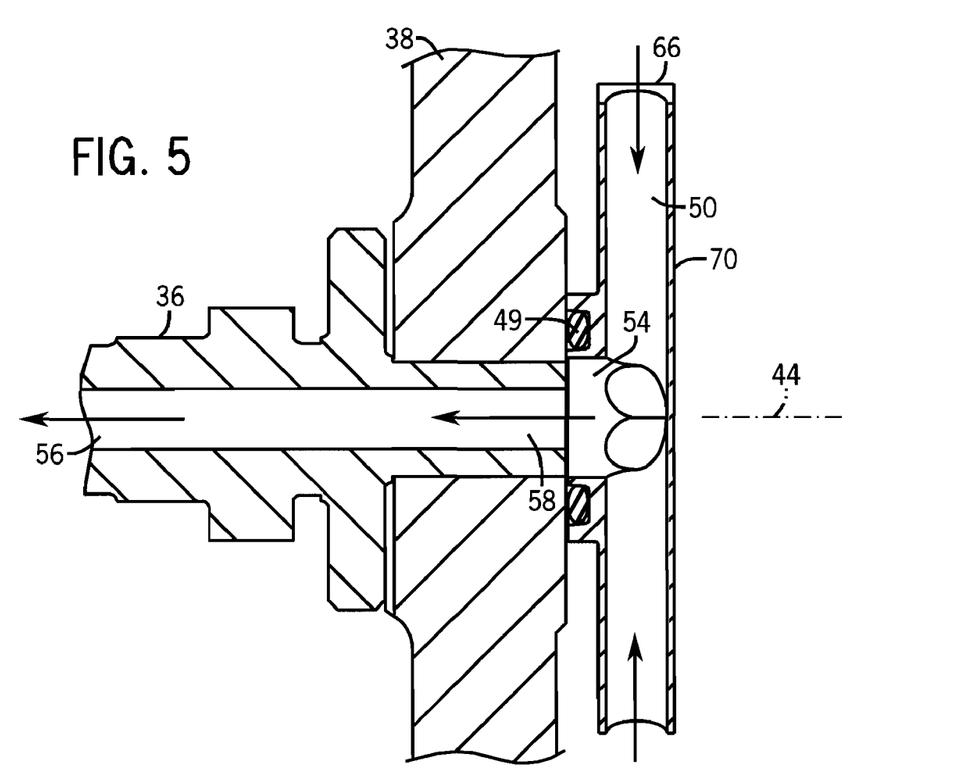
FIG. 5 is a sectional view taken along line 5-5 of FIG. 2.

FIG. 1 shows a gas-oil separator 30 for an internal combustion engine 32, a portion of which is shown at crankcase endplate 34 and camshaft 36 having a gear or camshaft wheel 38 mounted thereto and rotary therewith. The engine has an interior chamber 40 having a gas-oil mist therein. A rotative inertial impactor 42 is provided within interior chamber 40 and mounted to a rotating engine shaft in the interior chamber and rotating therewith about a rotational axis 44. In one embodiment, separator 42 is mounted to camshaft gear wheel 38 by bolts such as 46, 48, and sealed thereto by O-ring gasket 49. The gas-oil mist enters a plurality of radially extending passages such as 50, 52, etc. and is separated by inertial impaction against the wall of the passage as separator 42 rotates, whereby the separator separates gas and oil from the gas-oil mist by inertial impaction. The separated liquid oil droplets are flung outwardly by centrifugal force back into interior chamber 40. The separator 42 has a central gas outlet 54, FIG. 5, discharging separated gas from the gas-oil mist. The rotating engine shaft, e.g. camshaft 36, is hollow as shown at axially extending hollow passage 56 which provides an axial gas flow passage therealong having a gas inlet 58 receiving separated gas from gas outlet 54 of the separator, and having a gas outlet 60, FIG. 1, discharging the separated gas. The gas outlet 60 of hollow rotating engine shaft 36 is vented, e.g. at conduit 62, to a lower pressure than the pressure in interior chamber 40. For example, gas outlet 60 of hollow rotating engine shaft 36 may be vented at outlet tube 62 to atmosphere or to the air suction intake side of a fuel-air induction system. Accordingly, there is a differential pressure between interior chamber 40 and gas outlet 60 of hollow rotating engine shaft 36. This differential pressure provides a biased directional flow which is directed to separator 42 through passages 50, 52, etc. and then through passage 56 of hollow rotating engine shaft 36 to gas outlet 60. In the embodiment of FIG. 1, separator 42 is a disk having an outer circumference 64 with a plurality of radially inwardly directed flow ports 66, 68, etc. and a respective plurality of the noted radial passages 50, 52, etc. directing flow radially inwardly therefrom.

Figure 3:
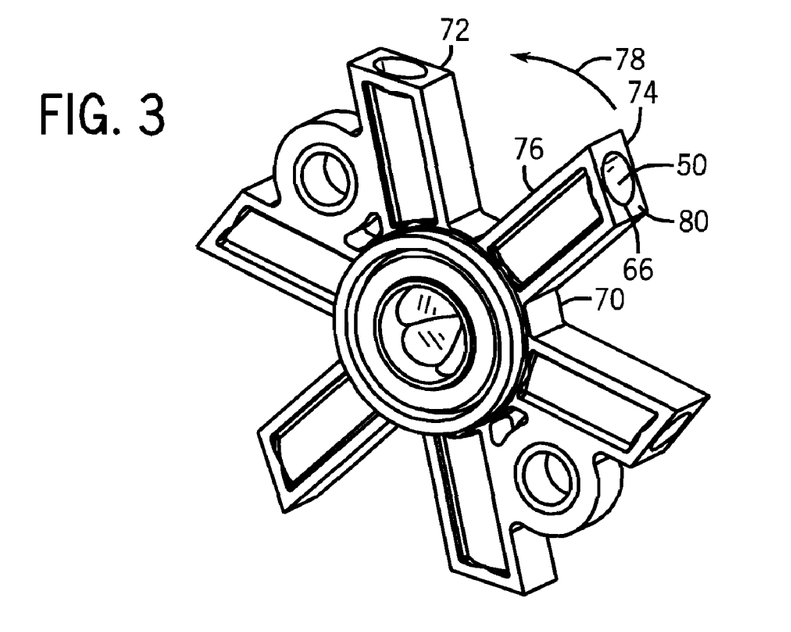
FIG. 3 is an enlarged perspective view of a portion of FIG. 2.
Figure 4:
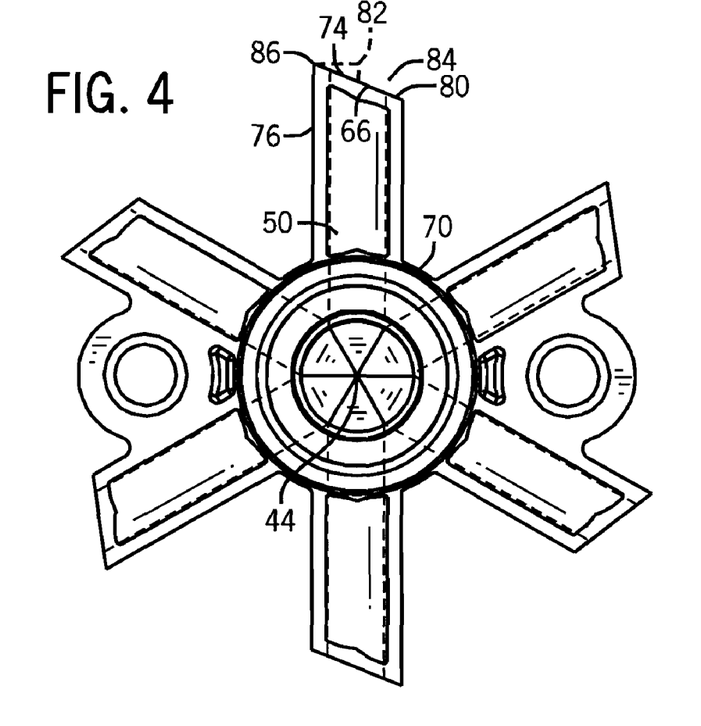
FIG. 4 is an end view of the construction of FIG. 3.

FIGS. 2-4 show a further embodiment and use like reference numerals from above where appropriate to facilitate understanding. Separator disk 70 has a plurality of tips such as 72, 74, etc. formed therealong, each having a leading face such as 76 facing in the direction of rotation 78 and providing an impaction surface causing separation of the gas-oil mist, in addition to the impaction surface formed by the wall of the radially inwardly extending passage such as 50. Each of the noted tips also has a trailing face such as 80 with a respective radially inwardly directed flow port therethrough such as 66. In one embodiment, trailing face 80 at radially inwardly directed flow port 66 is along a cut-back angle 82, FIG. 4, providing a negative pressure zone 84 at radially inwardly directed flow port 66 such that the latter sucks separated gas thereinto. Tip 74 has an outermost edge 86 at a first portion at a first radial distance from axis 44, and a second portion at 80 trailing the noted first portion at 86 and at a second radial distance from axis 44. Radially inwardly directed flow port 66 is at the noted second portion 80, and the noted second radial distance is less than the noted first radial distance.

Figure 6:
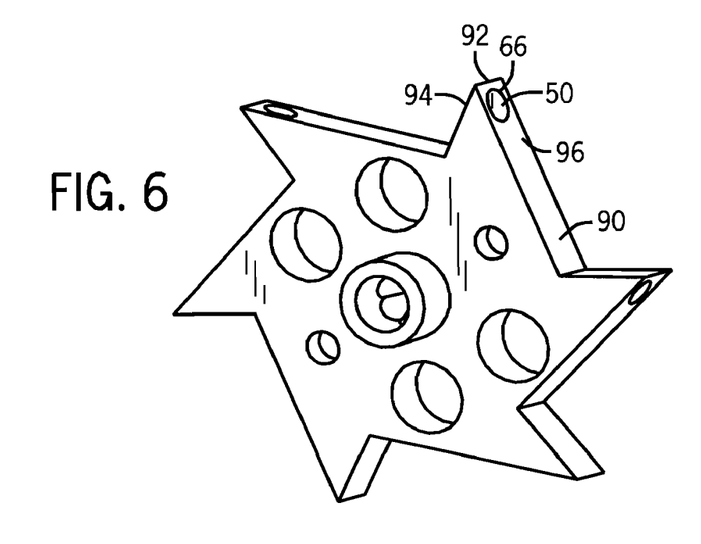
FIG. 6 is like FIG. 3 and shows a further embodiment.

FIG. 6 shows a further embodiment of a separator disk 90 having an outer circumference with a plurality of tips such as 92, each having a leading face 94 facing in the direction of rotation and providing an impaction surface causing separation of the gas-oil mist, in addition to the impaction surface provided by the wall of passage 50, and having a trailing face 96 with a respective radially inwardly directed flow port 66 therethrough.

Figure 7:
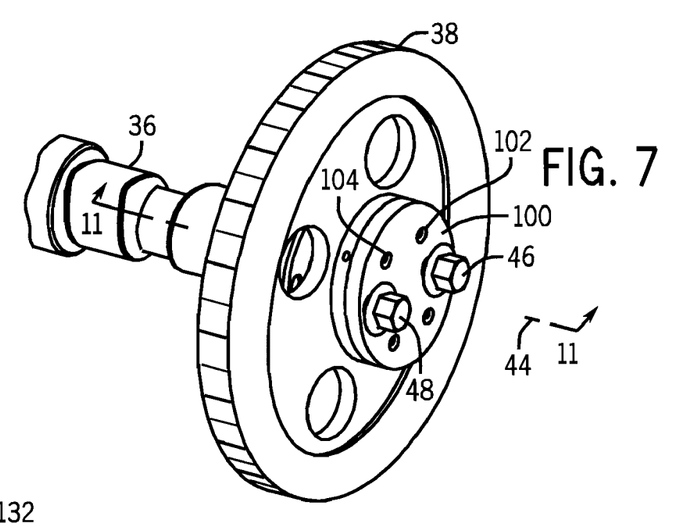
FIG. 7 is like FIG. 2 and shows another embodiment.
Figures 8, 9:
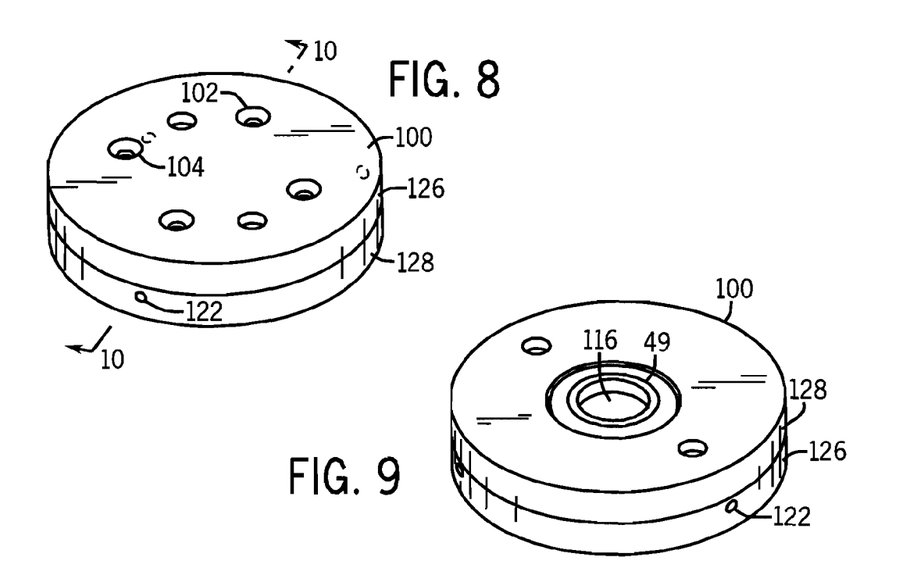
FIG. 8 is an enlarged perspective view of a portion of FIG. 7.
FIG. 9 is a perspective view from below of the construction of FIG. 8.
Figure 10:
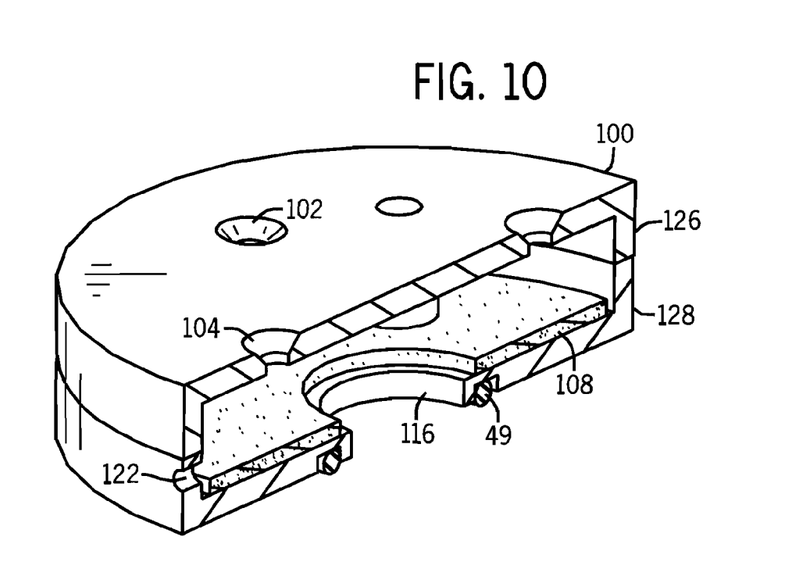
FIG. 10 is a sectional view taken along line 10-10 of FIG. 8.
Figures 11, 16:
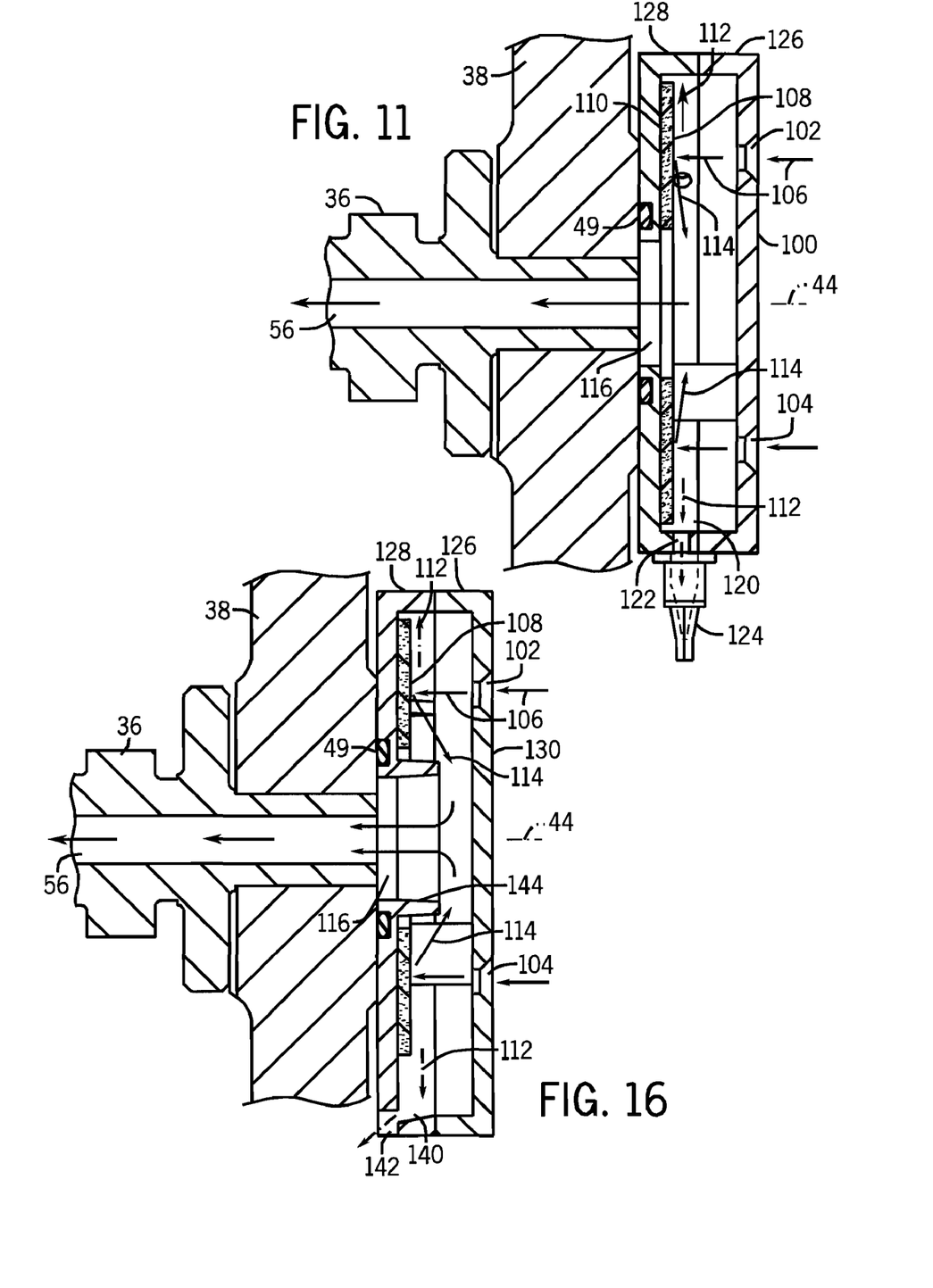
FIG. 11 is a sectional view taken along line 11-11 of FIG. 7.
FIG. 16 is a sectional view taken along line 16-16 of FIG. 12.
Figure 12:
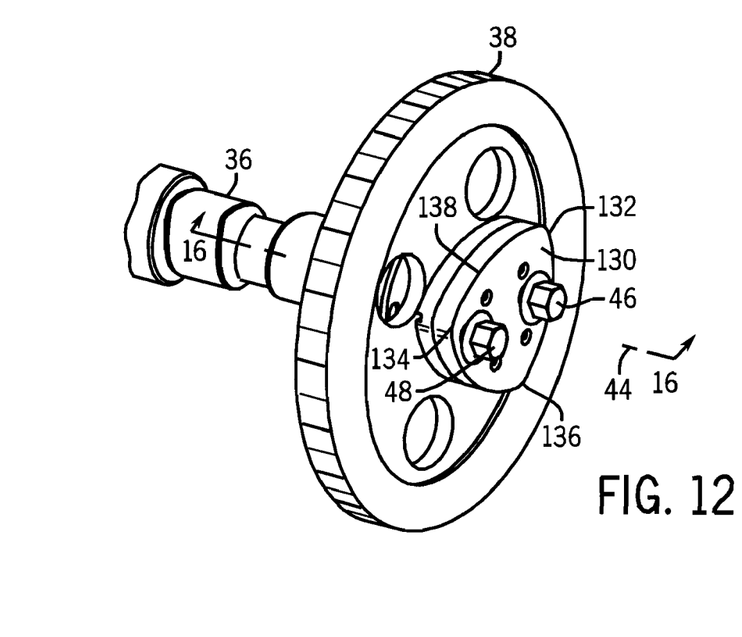
FIG. 12 is like FIG. 7 and shows another embodiment.
Figure 13:
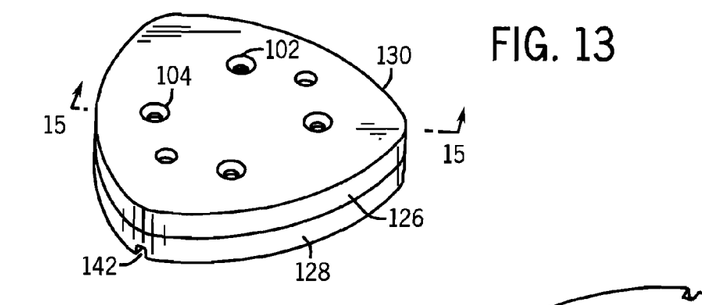
FIG. 13 is an enlarged perspective view of a portion of FIG. 12.
Figure 14:
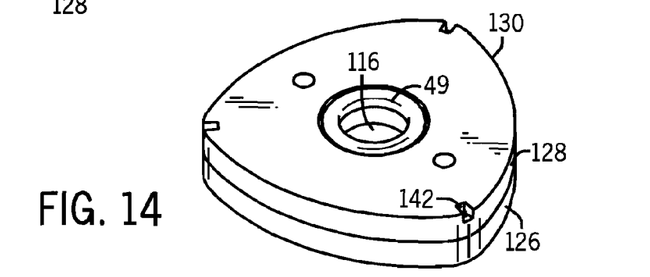
FIG. 14 is a perspective view from below of the construction of FIG. 13.
Figure 15:
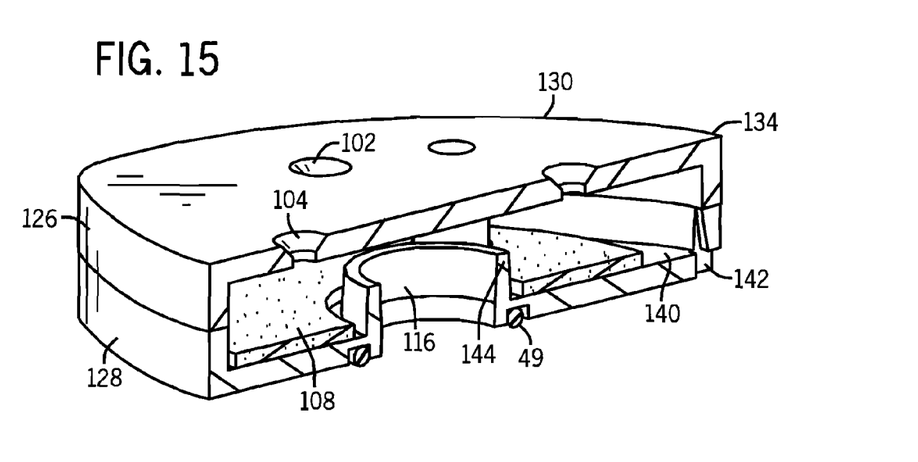
FIG. 15 is a sectional view taken along line 15-15 of FIG. 13.

FIG. 7 shows a further embodiment having a separator disk 100 having a plurality of axially directed flow nozzles such as 102, 104, etc. directing flow axially therethrough, as shown at arrow 106, FIG. 11, against an impaction surface 108 causing separation of the gas-oil mist. In one embodiment, the impactor collector 108 has a rough porous collection or impingement surface, e.g. a fibrous media pad, causing liquid oil particle separation from the gas-oil stream, and is like that shown in U.S. Pat. No. 6,290,738, incorporated herein by reference. In another embodiment, a smooth impervious impingement surface is used, e.g. at 110, without pad 108, providing a sharp cut-off size particle separation, as noted in the '738 patent. Nozzles 102, 104, etc. may be provided by orifices having a venturi or frustoconical shape as in the incorporated '738 patent. The separated liquid oil droplets are flung radially outwardly by centrifugal force as shown at arrows 112. The separated gas flows as shown at arrows 114 to gas outlet 116, as driven by the noted pressure differential, and then through the axial gas flow passage 56 through hollow rotating engine shaft 36 to gas outlet 60 and conduit 62 for discharge to atmosphere (open crankcase ventilation, OCV), or recirculated back to the engine's air intake system (closed crankcase ventilation, CCV).

Disk 100 has an outer collection chamber 120 spaced radially outwardly of nozzles 102, 104, etc. relative to axis 44. The outer collection chamber has a drain port 122 draining the separated oil. In one embodiment, a one-way drain valve 124, e.g. a duckbill valve or other unidirectional valve, is provided at drain port 122 permitting drainage of separated oil out of the drain port, and blocking reverse flow of gas in the opposite direction back into the drain port. The valve has a normally closed condition and is biased, e.g. the naturally biased closed condition of a duckbill valve, or a spring biased ball valve, etc., to remain closed until a given oil head pressure in collection chamber 120 plus centrifugal pressure due to rotation overcomes such bias, which bias includes gas pressure in interior chamber 40. In one embodiment, the drain valve is calibrated such that centrifugal pressure alone, absent the noted given oil head pressure in collection chamber 120, is insufficient to overcome the noted bias and open the drain valve. Separator disk 100 includes an outer cover 126 having the noted nozzles 102, 104, etc. formed therethrough, and a mating base 128 forming collection chamber 120 and mounted to camshaft gear wheel 38 by bolts such as 46, 48, as above, and sealed thereto by O-ring gasket 49.

FIGS. 12-16 show a further embodiment and use like reference numerals from above where appropriate to facilitate understanding. Separator disk 130 has one or more lobes, e.g. three lobes 132, 134, 136 in the case of a triangular shaped disk, though other shapes may be used, which lobes are spaced farther radially outwardly from axis 44 then the remainder of the disk as at 138. The lobes provide eccentric collection chambers such as 140 each having a respective drain port such as 142. In each of the embodiments of FIGS. 7-16, a partially axially extending dividing wall 144 may be provided to prevent liquid oil carryover to gas outlet 116. A drain valve may be provided at drain port 142, comparably to drain valve 124 at drain port 122.

Figures 17, 18:
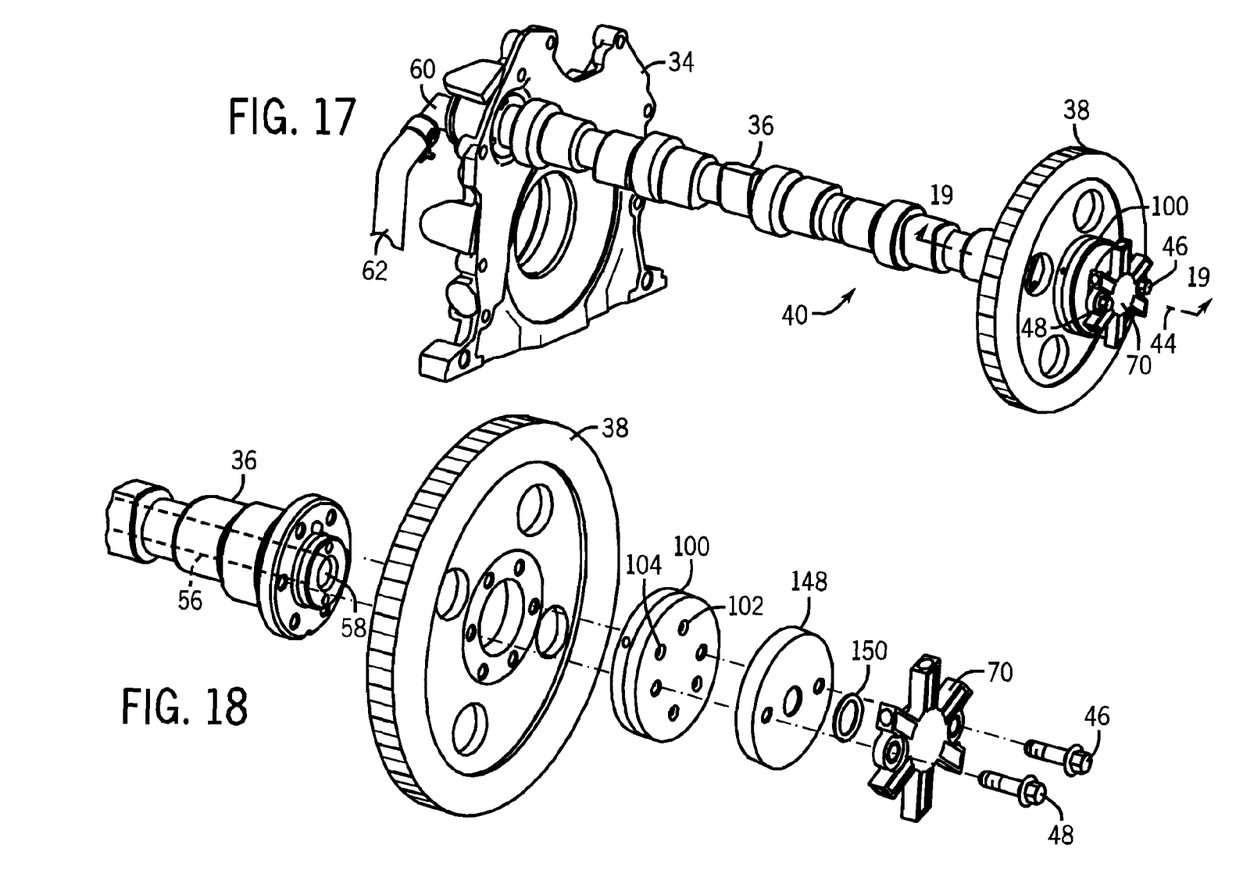
FIG. 17 is like FIG. 1 and shows another embodiment.
FIG. 18 is an exploded perspective view of a portion of FIG. 17.
Figure 19:
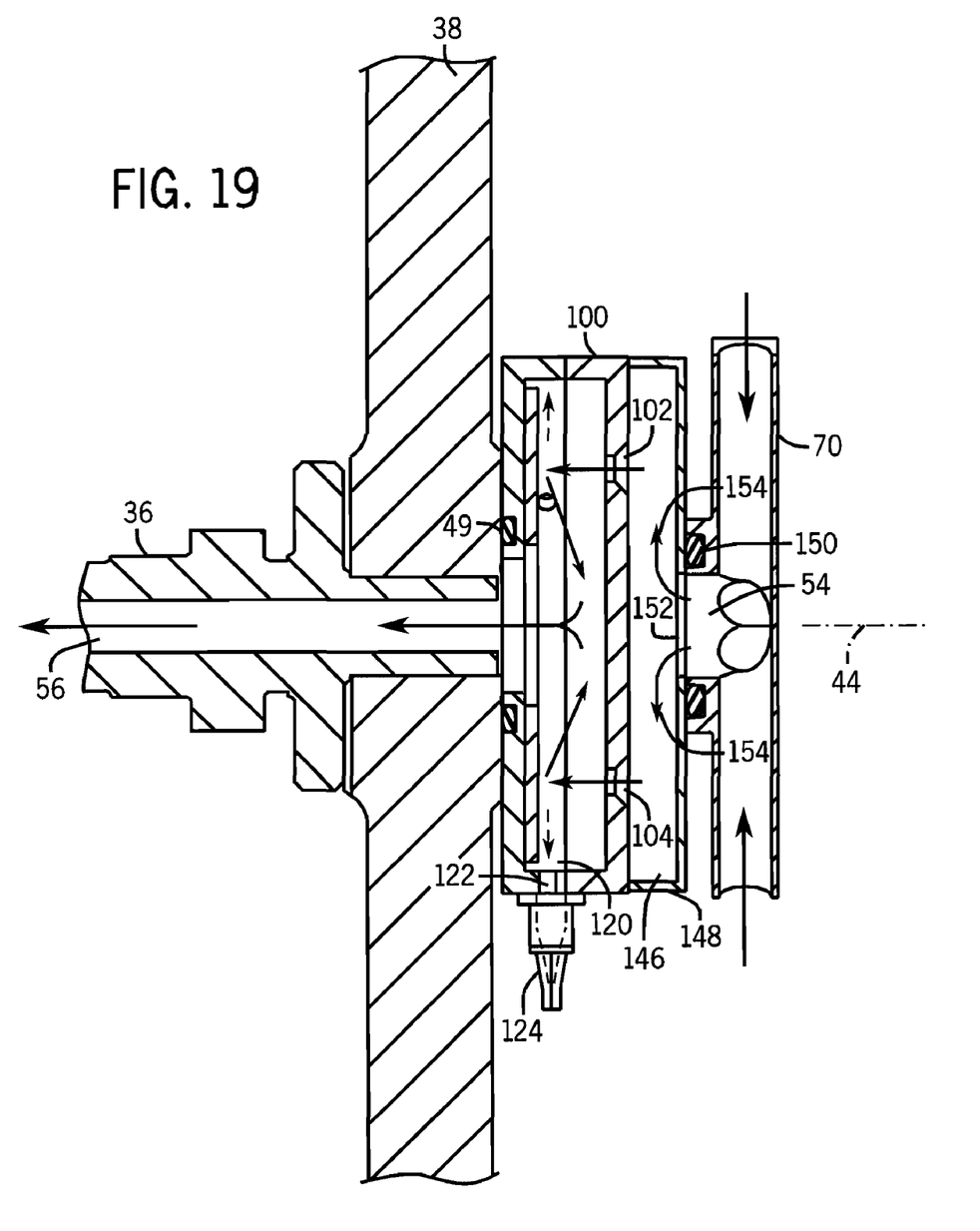
FIG. 19 is a sectional view taken along line 19-19 of FIG. 17.

FIGS. 17-19 show a further embodiment and use like reference numerals from above where appropriate to facilitate understanding. A first coarse pre-cleaner rotative inertial impactor separator is provided at 70 as above, and a second finer scrubber rotative inertial impactor separator is provided at 100 as above. The first and second separators 70 and 100 are within interior chamber 40 and mounted to rotating engine shaft 36 in interior chamber 40 and rotate therewith about rotation axis 44. First and second separators 70 and 100 are axially aligned along the same rotational axis 44 and separate gas and oil from the gas-oil mist by inertial impaction. The gas-oil mist flows serially through separators 70 and 100, initially through first separator 70 and then through second separator 100. The separators are mounted to each other and to camshaft gear wheel 38 by the noted bolts 46, 48. A transition plenum 146 is provided by cup-shaped cover 148 mounted between the separators and sealed to separator 70 at O-ring gasket 150 and having a central aperture 152 communicating with the central outlet 54 of separator 70 and providing a flow passage as shown at arrows 154 to nozzles 102, 104, etc.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A gas-oil separator for an internal combustion engine having an interior chamber having a gas-oil mist therein, comprising a rotative inertial impactor separator within said interior chamber and mounted to a rotating engine shaft in said interior chamber and rotating therewith about a rotational axis, said separator separating gas and oil from said gas-oil mist by inertial impaction, wherein said separator comprises a disc having a plurality of axially directed flow nozzles directing flow axially therethrough against an impaction surface causing separation of said gas-oil mist, wherein said impaction surface extends radially relative to said axis such that axial flow through said nozzles strikes said impaction surface, causing a sharp directional change effecting oil separation.

2. The gas-oil separator according to claim 1 wherein said disc has an outer collection chamber spaced radially outwardly of said nozzles relative to said axis, said outer collection chamber having a drain port draining separated oil.

3. The gas-oil separator according to claim 2 comprising a one-way drain valve at said drain port permitting drainage of separated oil out of said drain port, and blocking reverse flow of gas in the opposite direction back into said drain port, said valve having a normally closed condition and biased to remain closed until a given oil head pressure in said collection chamber plus centrifugal pressure due to said rotation overcomes such bias, said bias including gas pressure in said interior chamber.

4. The gas-oil separator according to claim 3 wherein said drain valve is calibrated such that centrifugal pressure alone, absent said given oil head pressure in said collection chamber, is insufficient to overcome said bias and open said drain valve.

5. The gas-oil separator according to claim 2 wherein said disc has one or more outer lobes spaced farther radially outwardly from said axis than the remainder of said disc and providing respective eccentric collection chambers each having a respective said drain port.

6. The gas-oil separator according to claim 2 wherein said separator has a gas outlet discharging separated gas from said gas-oil mist, and said rotating engine shaft is hollow and has an axial gas flow passage therealong having a gas inlet receiving said separated gas from said gas outlet of said separator, and having a gas outlet discharging said separated gas, wherein said gas outlet of said hollow rotating engine shaft is vented to a lower pressure than the pressure in said interior chamber such that there is a differential pressure therebetween, and such that a biased directional flow is directed to said separator and through said hollow rotating engine shaft to said gas outlet by said differential pressure, separated oil flowing in a first radial direction radially outwardly to said collection chamber, separated gas flowing in a second opposite radial direction radially inwardly to said hollow rotating engine shaft and into said axial gas flow passage.

7. A gas-oil separator for an internal combustion engine having an interior chamber having a gas-oil mist therein, comprising a first coarse pre-cleaner rotative inertial impactor separator, and a second finer scrubber rotative inertial impactor separator, said first and second separators being within said interior chamber, said second separator comprising a disc having a plurality of axially directed flow nozzles directing flow axially therethrough against an impaction surface causing separation of said gas-oil mist, wherein said impaction surface extends radially relative to said axis such that axial flow through said nozzles strikes said impaction surface, causing a sharp directional change effecting oil separation.

8. The gas-oil separator according to claim 7 wherein said first and second separators are mounted to a rotating engine shaft in said interior chamber and rotate therewith about a rotational axis.

9. The gas-oil separator according to claim 8 wherein said first and second separators are axially aligned along the same said rotational axis and separate gas and oil from said gas-oil mist by inertial impaction.

10. The gas-oil separator according to claim 9 wherein said gas-oil mist flows serially through said separators, initially through said first separator and then through said second separator.

11. The gas-oil separator according to claim 9 wherein said rotating engine shaft is hollow and has an axial gas flow passage therealong having a gas inlet receiving separated gas from at least one of said separators, and having a gas outlet discharging said separated gas.

12. The gas-oil separator according to claim 9 wherein said gas outlet of said hollow rotating engine shaft is vented to a lower pressure than the pressure in said interior chamber such that there is a differential pressure therebetween, and such that a biased directional flow is directed through said hollow rotating engine shaft to said gas outlet by said differential pressure.

\* \* \* \* \*